Aug. 25, 1964   W. S. BACHMAN   3,145,690
WEIGHT DISCRIMINATING AUTOMATIC BIRD FEEDER
Filed April 2, 1962
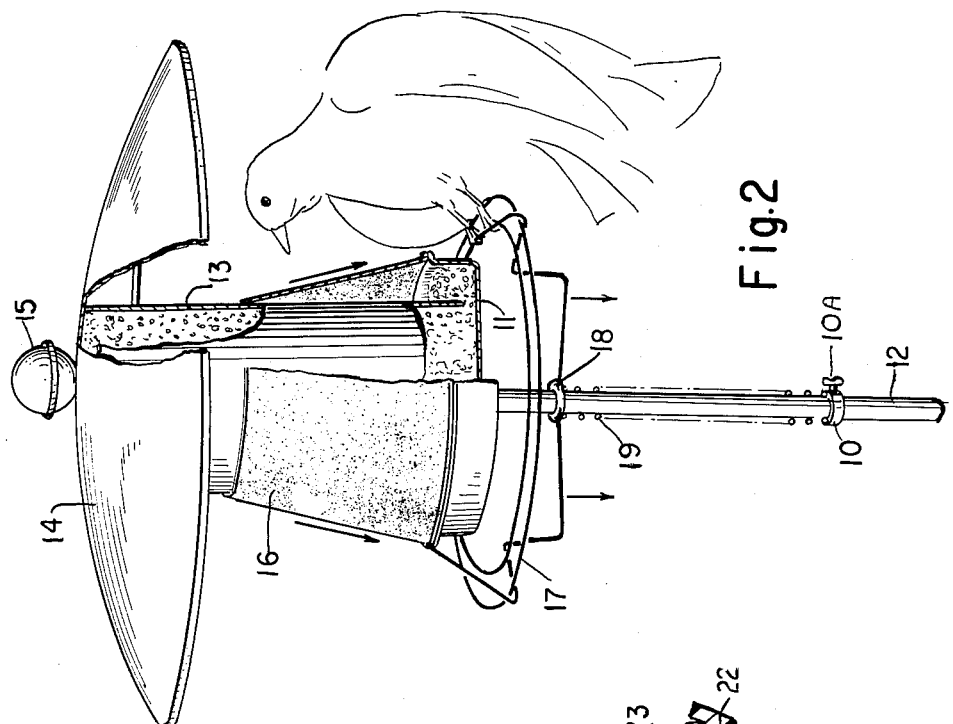
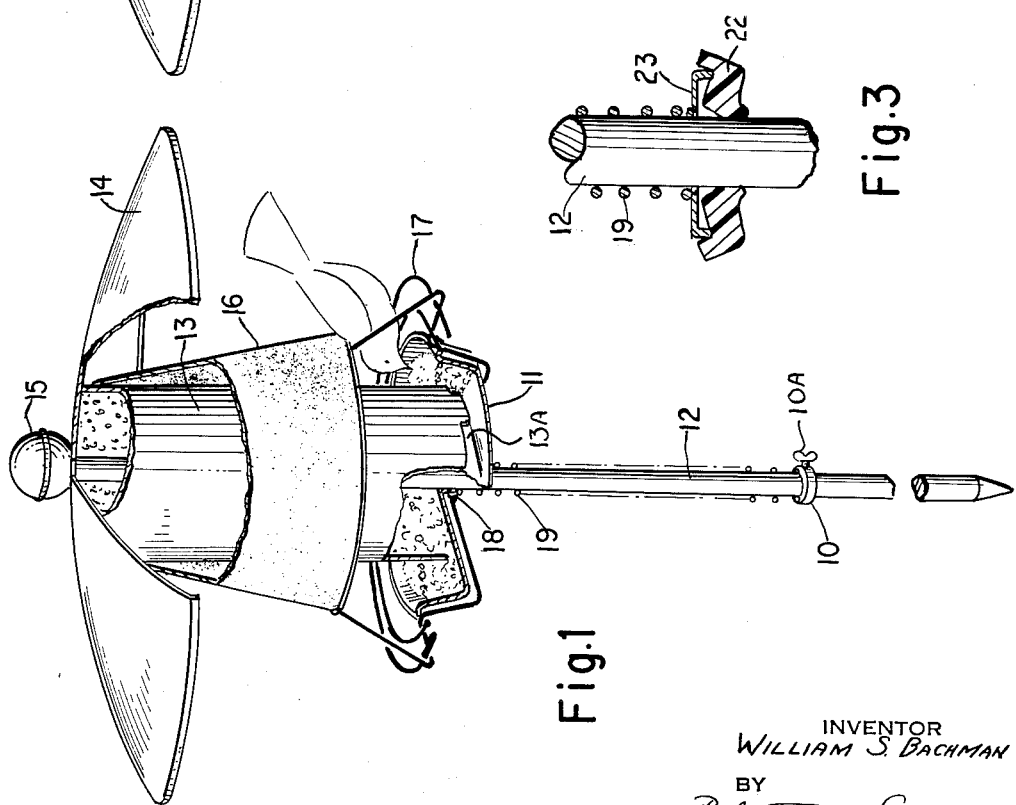
INVENTOR
WILLIAM S. BACHMAN
BY
Robertson & Smythe
ATTORNEYS 3,145,690
WEIGHT DISCRIMINATING AUTOMATIC
BIRD FEEDER
William S. Bachman, 26 Spruce St., Southport, Conn.
Filed Apr. 2, 1962, Ser. No. 184,167
5 Claims. (Cl. 119—51)

This invention relates to feeders for animals, and particularly to bird feeding arrangements.

One of the problems in arrangements for providing feed for birds, especially small birds, is to prevent squirrels or similar animals or larger birds from gaining access to the feed. Shields and various devices have been placed on the upright or on the holding means for the feeder but these have not always protected the feed.

One of the objects of the invention is to provide a simple, rugged structure which will be economical to manufacture and reliable in operation and which will prevent undesirable birds or animals from reaching the feed.

Another of the objects of the invention is to shut off feed to birds and animals of more than a predetermined weight.

In one aspect of the invention, the feed container including a platform and container means is supported on a post, the platform being a tray for receiving feed in controlled amounts from the reservoir or container means. A hood means is vertically slidable relative to the platform or tray so as to cover the same when the hood is in a lowered or depressed condition. A perch is connected to said hood and is slidably mounted relative to the support. A spring is mounted under the perch or related thereto so as normally to hold the hood or perch in raised or open feed position. When an animal, such as a squirrel or a bird heavier than desirable to feed, puts weight on the perch, the hood and perch will move downwardly against the force exerted by the spring so as to close access to the food tray. A collar or other means may serve as an abutment for the lower end of the spring, the collar being adjustably slidable thereon for varying the weight required to close the hood onto the tray.

Other of the objects, advantages and features of the invention will become apparent from the following description and drawings which are merely exemplary.

In the drawings:

FIG. 1 is a perspective view of the feeder in post-supported form.

FIG. 2 is a perspective view of the feeder with the feed supply shut off.

FIG. 3 is an enlarged, fragmentary, perspective view of another form of spring holding means.

Referring to FIG. 1, feed tray 11 is secured to a vertical shaft 12 which may be a support post adapted to be set in the ground. Feed hopper 13, having openings 13A at its bottom edge, bears upon the feed tray 11, permitting a controlled quantity of feed to reach the tray. A protecting cover 14 bears upon the hopper 13 and is held in place by nut 15 threaded to shaft 12. Surrounding hopper 13 is a conical or suitably shaped hood 16, the upper edge of which is guided by hopper 13 and is free to slide vertically thereon. Fixed in spaced relation to the lower edge of the hood 16 is a perch 17, the perch being formed of wire or other material. The perch 17 is adapted to surround feed tray 11, and the center of the perch 17 is provided with a bearing 18 which is guided by, and free to slide vertically upon, the shaft 12. The space between the lower edge of the hood 16 and the perch 17 is the opening through which access to the feed can be obtained by the bird.

The lower bearing 18 of perch 17 is supported by compression spring 19. The lower end of the spring 19 bears upon an adjustable collar 10 which clamps to the shaft 12. The collar 10 may have a set screw 10A to hold it in place. It is desirable to use a long spring to minimize the differential force it exerts between the open and closed positions of the hood. By means of collar 10, the spring may be adjusted to support the weight of the hood 16 and perch 17 assembly, plus that of the heaviest bird it is desired to accommodate. Any heavier bird or animal alighting or climbing upon perch 17 with the related hood assembly will cause the assembly including hood 16 to descend, in which lowered position hood 16 will cover the feed tray 11 seen in FIG. 2, where a bird or relatively heavy weight is illustrated as being on the perch 17. Upon release of the excess weight, the hood and perch assembly will resume its open position as in FIG. 1, in which birds of less than the chosen or predetermined weight limit find ready access to the feed.

The collar 10 can be replaced by a rubber or resilient washer 22 seen in FIG. 3. Cup-shaped member 23 has spring 19 resting thereon. This arrangement is such that the forces exerted on the washer will cause it to grip the support 12 so as to maintain the spring in any desired adjusted position. The feeder also could be supported from the top by attaching a wire or rope (not shown) to knob 15.

It is to be understood that changes and alterations may be made to details of the invention without departing from the spirit and scope thereof except as defined in the appended claims.

What is claimed:

1. In a bird, or the like, feeding device, the combination comprising a feed container means arrangement having an area for holding feed so as to be accessible for feeding, platform means cooperating with said container means adapted to receive feed therefrom, support means fixedly mounting said container arrangement means and platform means on said support means, hood means slidably movable relative to said support means and surrounding said container means and selectively closing said feed area, resilient means supporting said hood means in an upper position so that normally said area is open, perch means mounted in fixed relation to said hood means so that when an object exceeding a predetermined weight is on said perch means, said hood means will slide relative to said container means and said area to block access to said area platform means, and connecting means located outside of said platform connecting said hood means and said perch means.

2. In a bird, or the like, feeding device, the combination comprising feed container means, feed receiving means cooperating with said container means adapted to controllably receive feed therefrom, support means fixedly mounting said container means and said feed receiving means on said support means, cover means slidably movable on said support means and surrounding said container means and selectively closing said feed receiving means, spring means supporting said cover means, and perch means surrounding said feed receiving means and mounted in fixed relation to said cover means, so that when an object exceeding a predetermined weight is on said perch means from any direction, said cover means will slide relative to said container means and block access to said feed receiving means.

3. In a bird, or the like, feeding device, the combination comprising feed container means, feed receiving means cooperating with said container means adapted to controllably receive feed therefrom, support means connected to said container means and said feed receiving means for supporting the same, cover means slidably movable relative to said support means and said container means surrounding said container means and selectively closing said feed receiving means, perch means mounted in fixed relation to said cover means, and spring means on said support means having one end in abutting relation with the under part of said perch means and its other end abutting a collar means on said support means so as to hold said cover means in a raised position, so that when an object exceeding a predetermined weight is on said perch means, said cover means will slide relative to said container means and block access to said feed receiving means.

4. In a bird, or the like, feeding device, the combination comprising feed container means, feed receiving means cooperating with said container means adapted to controllably receive feed therefrom, support means connected to said container means and said feed receiving means for supporting the same, cover means slidably movable relative to said support means and said container means surrounding said container means and selectively closing said feed receiving means, perch means mounted in fixed relation to said cover means and spring means on said support means having one end in abutting relation with the under part of said perch means and its other end abutting an adjustable collar means on said support means so as to hold said cover means in a raised position, so that when an object exceeding a predetermined weight is on said perch means, said cover means will slide relative to said container means and block access to said feed receiving means.

5. In a bird, or the like, feeding device, the combination comprising feed container means, feed receiving means cooperating with said container means adapted to controllably receive feed therefrom, support means connected to said container means and said feed receiving means for supporting the same, lid means removably attached to said support means shielding said feed container means, cover means slidably movable relative to said support means and said feed container means surrounding and selectively closing said feed receiving means, perch means surrounding said feed receiving means and mounted in fixed relation to said cover means, spring means on said support means having one end in abutting relation with said perch means and its other end abutting a collar means on said support means so as to hold said cover means in a raised position, and connecting arms extending outside of said feed receiving means for connecting said cover and perch means, so that when an object exceeding a predetermined weight is on said perch means from any direction, said cover means will slide and block access to said feed receiving means.

References Cited in the file of this patent

UNITED STATES PATENTS

| | | |
|---|---|---|
| 2,891,508 | Bower | June 23, 1959 |
| 2,918,901 | Poulsen | Dec. 29, 1959 |
| 2,965,070 | Myrick | Dec. 20, 1960 |

OTHER REFERENCES

Popular Mechanics, January 1943, page 71.